June 1, 1948. M. E. COLLINS 2,442,400
FILM DRIVE APPARATUS
Filed July 4, 1945 3 Sheets-Sheet 1

MILFORD E. COLLINS,
INVENTOR.

BY
ATTORNEY.

June 1, 1948.  M. E. COLLINS  2,442,400
FILM DRIVE APPARATUS
Filed July 4, 1945  3 Sheets-Sheet 2
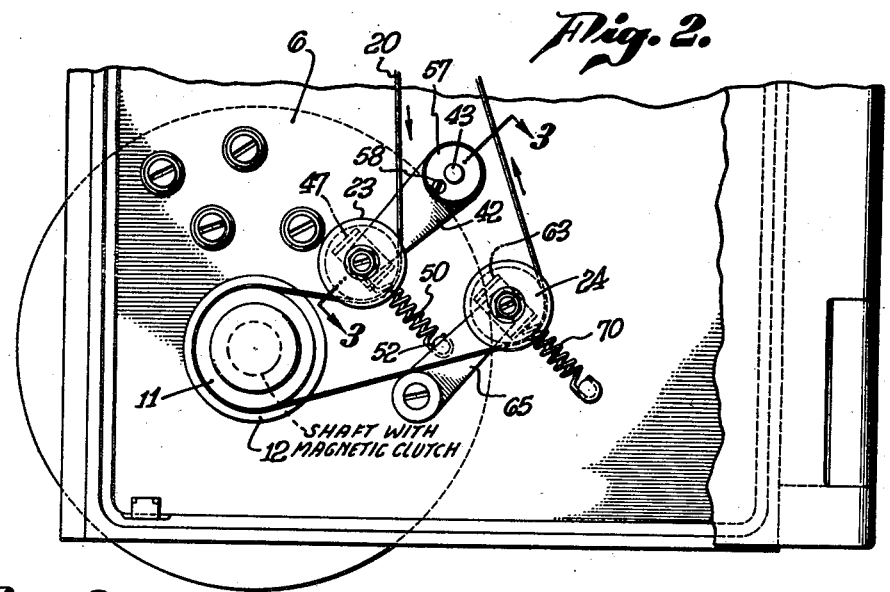
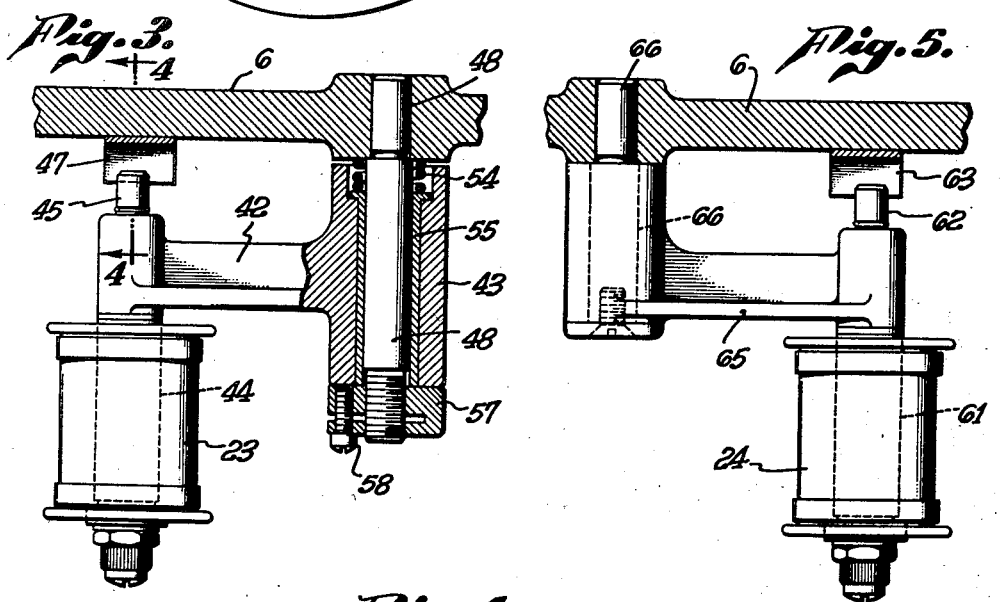
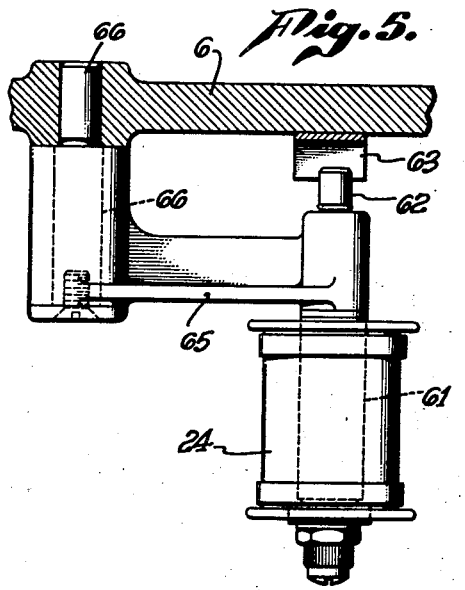
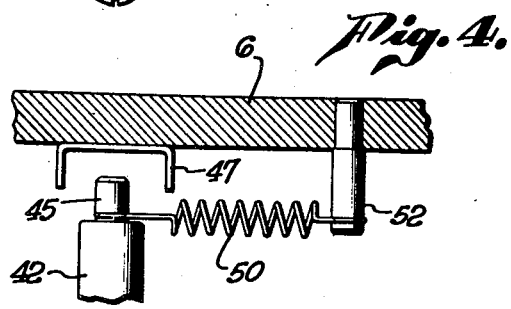
MILFORD E. COLLINS,
INVENTOR.
BY *Val R. Graham*
ATTORNEY.

June 1, 1948. M. E. COLLINS 2,442,400
FILM DRIVE APPARATUS
Filed July 4, 1945 3 Sheets-Sheet 3
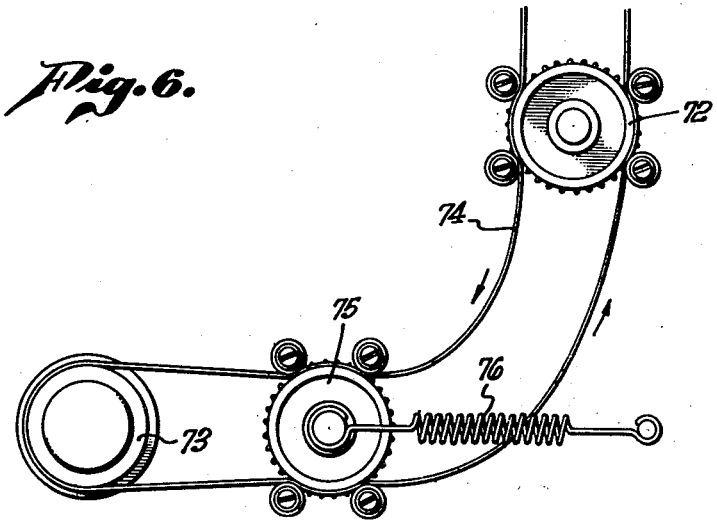
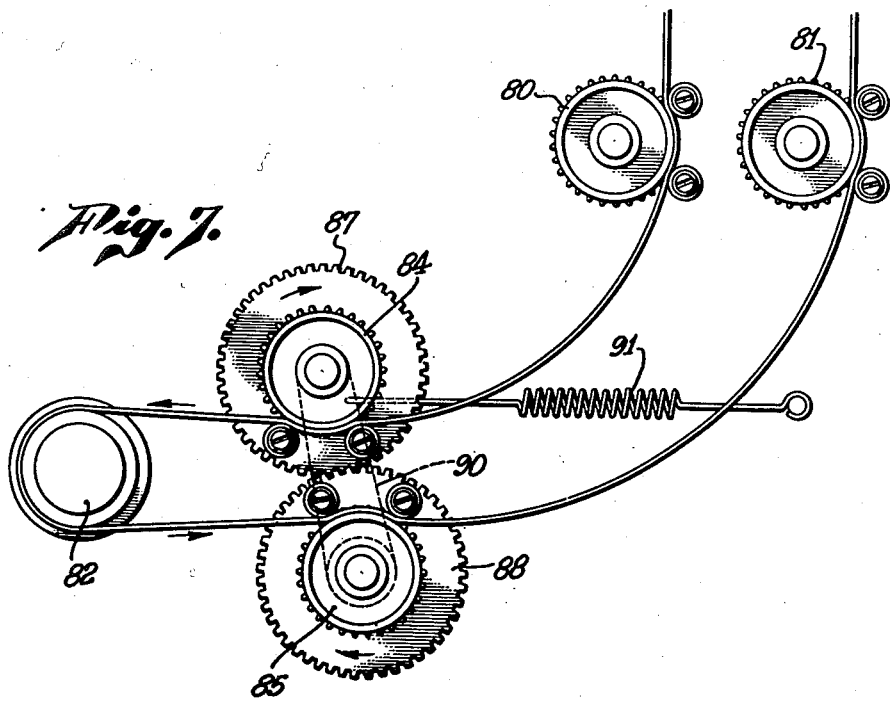
MILFORD E. COLLINS,
INVENTOR.
BY
ATTORNEY.

Patented June 1, 1948

2,442,400

UNITED STATES PATENT OFFICE 2,442,400

FILM DRIVE APPARATUS

Milford E. Collins, Los Angeles, Calif., assignor to Radio Corporation of America, a corporation of Delaware Application July 4, 1945, Serial No. 603,210

1 Claim. (Cl. 271—2.3)

This invention relates to sound motion picture film apparatus, and particularly to an improved sound recorder drive wherein a simplified film path provides a uniform and constant film motion at the translation point where the sound modulated light is impressed on the film.

In the art of sound recording, particularly on motion picture film, many types of film drives have been suggested and employed in commercial practice. The primary object of all such film advancing mechanisms is to provide a uniform and constant film motion at the point of light impression. Many systems introduce slow variations in the film speed which produce low frequency "wows." This is primarily caused by unbalanced mechanical constructions or designs and lack of damping. Other film advancing mechanisms produce higher frequency speed variations generally caused by short period variations in the film tension as it comes from the supply reel and is wound on the take-up reel. Certain prior mechanical filters permit the film jerks to be transmitted to the translation point. Some film drives, although producing a desirable film motion over the recording drum, nevertheless are complicated mechanisms and require continuous inspection and frequent adjustments. Many drives employ soft film loops on both sides of the recording drum which prevent the film from lying flat against the drum adjacent the sprocket holes.

The present invention is directed to a simple drive with a minimum of operating elements, but which provides a particularly uniform film motion at the translation point. The invention utilizes certain features of prior film drives which have provided good film motion, such as a magnetic coupled drive for the film drum, this invention being shown in Kellogg Patent No. Re. 19,270, of August 14, 1934. This feature, coupled with a combination feed and drive sprocket in combination with a simplified form of tensioned guide rollers, provides a short film path which is easy to thread and adjust, and which corrects many faults of prior designs. Several forms of drives are described hereinafter, one being shown incorporated in a complete sound recorder, this form having given excellent results because of the features mentioned above.

The principal object of the invention, therefore, is to facilitate the recording of sound on film.

Another object of the invention is to provide an improved film drive for a sound recorder or reproducer.

A further object of the invention is to provide a steady and uniform film motion at a light translation point with a simple film path.

A still further object of the invention is to provide a film drive having a minimum of elements between the drive sprocket and the recording drum, while providing maximum filter action to eliminate the introduction of speed irregularities at the translation point and providing a tight film wrap over the recording drum.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 2 is a partial section of the drive shown in Fig. 1.

Fig. 3 is a partial cross sectional view of one of the guide rollers taken along the line 3—3 of Fig. 2.

Fig. 4 is a detail of the guide roller taken along the line 4—4 of Fig. 3.

Fig. 5 is a plan view of the other guide roller shown in Fig. 2, and

Figs. 6 and 7 are diagrammatic views of modifications of the film drive embodying the principles of the invention.

Figure 1:
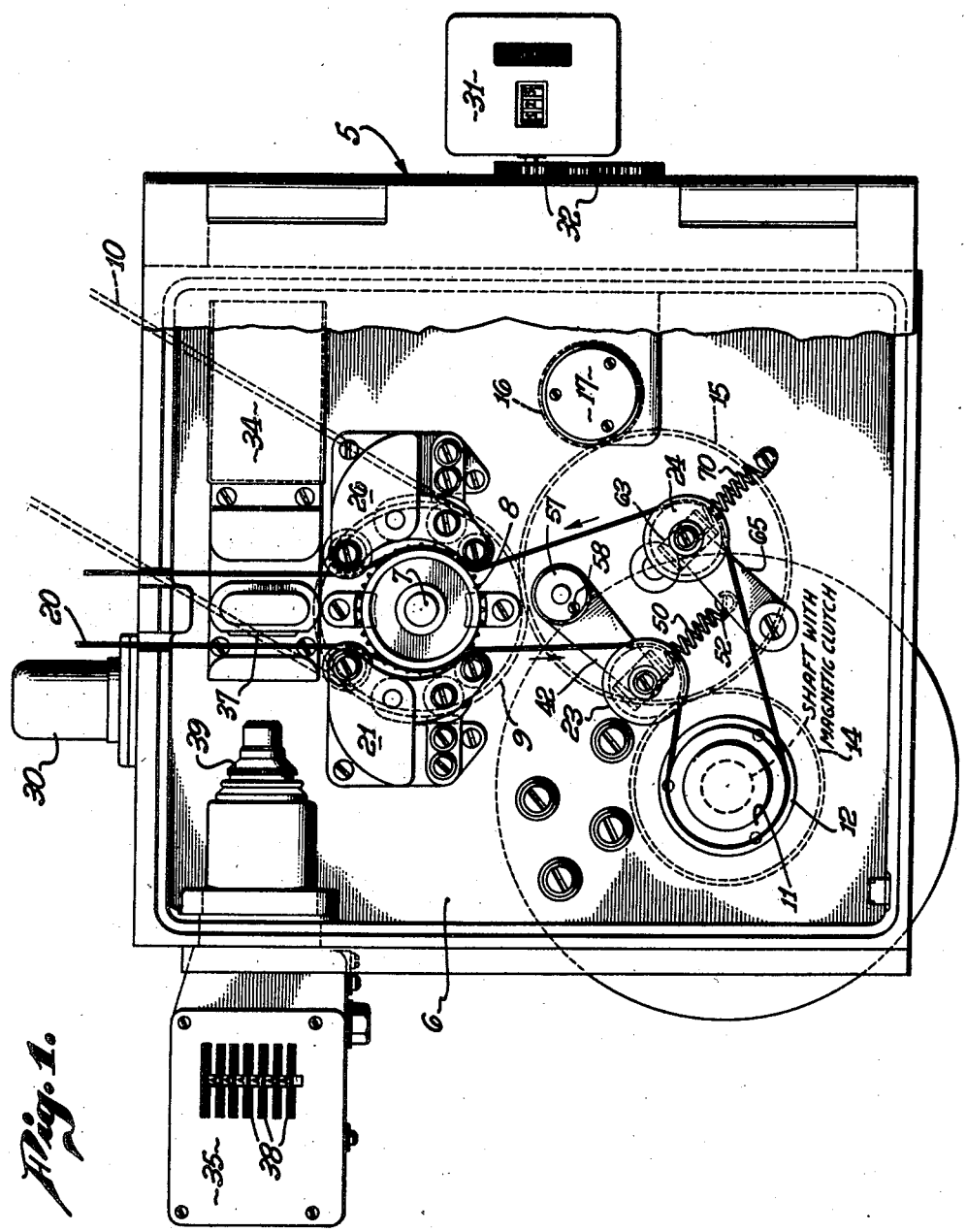
Fig. 1 is an elevational view of the main section of a sound recorder embodying the invention.

Referring now to Figs. 1–5, inclusive, in which the same numerals identify like elements, a housing 5 with a back plate 6 has mounted thereon a shaft 7 carrying a film sprocket 8 and a chain sprocket wheel 9, the latter driving a chain 10 for rotating a take-up reel, not shown. Also mounted on the plate 6 is a shaft upon which is mounted a film drum 11 having a back flange 12. Mounted on the shaft driving the drum 11 is a magnetic clutch arrangement, which is disclosed and claimed in the above-identified Kellogg patent, and which is driven by gear 14 from an idler gear 15 which also drives a gear on the shaft 7, the idler gear 15 being driven by a gear 16 on a shaft having an end bearing shown at 17. Film 20 is shown threaded in the recorder, its direction of advancement being indicated by the arrows. The film path is traced from the left-hand side of sprocket 8 under a pair of pad rollers in an assembly 21, then under a flanged guide roller 23, over the drum 11, around a flanged guide roller 24, and then over the right-hand side of sprocket 8 under a pair of pad rollers in an assembly 26. The pad roller assemblies shown at 21 and 26 are disclosed and claimed in my copending application, Ser. No. 536,461, filed May 20, 1944, now Patent No. 2,418,544, issued April 8, 1947.

At the top of the casing 5 is an oil reservoir 30, while at the right-hand side of the casing, a footage counter 31 is shown with its train of gears 32. The film passes through an assembly 34 to and from the sprocket 8, this assembly being a punching device. An assembly 35 is a film identifying or marking device, assemblies 34 and 35 being disclosed and claimed in my copending application, Ser. No. 603,209, filed July 4, 1945. Briefly, the assembly 34 includes a solenoid which operates a punch to perforate the film near its center so that the beginnings and ends of takes may be identified in the dark room. The solenoid also moves a focusing plate 37 against the film to maintain it in a position so that indicia arranged by wheels 38 may be photographed on the film through an optical system 39.

Referring now to Figs. 2-5, inclusive, the film 20 is guided to the single flanged drum 11 by a double flanged idler roller 23 mounted on an arm 42 having pivot bearing 43. The shaft 44 on which the roller 23 is rotatable, extends beyond the arm 42 as an extension 45 positioned between a U-shaped stop member 47. The bearing 43 is mounted on a shaft 48 fixedly held in the back plate 6. The roller 23 is under tension of a spring 50 attached in a groove of the extension 45 and to a pin 52 fixedly mounted in the plate 6. (See Fig. 4.) To insure that the roller 23 accurately guides the film to the recording drum, provision is made for a longitudinal adjustment of the roller which transversely adjusts the film. After the roller 23 has been properly aligned with the drum, no further adjustment is required, since the drum 11 is tapered and thus maintains the film in the proper position thereon. In Fig. 3, the adjusting mechanism for the roller is shown as consisting of a compression spring 54 which bears against the plate 6 and against a flange on a sleeve 55, thus urging the arm 42, and consequently, the roller 23 away from the supporting plate 6. The position of the arm 42 is adjusted and maintained against the spring 54 by means of a split nut 57 having a locking bolt 58 and which is adjustable on the threaded end of the shaft 48.

The take-off roller 24 is also double flanged and is similarly mounted on the plate 6, except that no provision is made for adjusting the roller longitudinally. Roller 24 is mounted on a shaft 61 having an extension 62 positioned between the U-shaped stop member 63. The shaft 61 is mounted on a bracket arm 65, one end of which is pivoted on a shaft 66 mounted in the plate 6. The U-shaped members 47 and 63 limit the movement of rollers 23 and 24, respectively, thus permitting for variations in the roller positions caused by film with different amounts of shrinkage.

In this film drive, film is pulled from the supply reel by the sprocket 8, the film passing along the left-hand side thereof. This same sprocket 8 also pulls the film around the drum 11 over the idler roller 24, the film being fed to the drum 11 around the roller 23. It will be noted that both film loops between the sprocket 8 and the drum 11 are under tension at all times, thus keeping the film tightly wrapped around the drum, which eliminates polygoning of the film at and adjacent to the perforated portion of the film. Low frequency variations are eliminated by the damping action of the magnetic drive, and high frequency variations are eliminated by the tensioning of the film and the filter action of the sprung idler rollers in combination with the magnetic drive.

To thread the recorder, it is only necessary to take the film loop from the magazine, place it around the recording drum 11 under the guide rollers 23 and 24, and over the sprocket 8, so that the springs 50 and 70 exert tension in the film loops between the sprocket 8 and the drum 11. This may be very quickly accomplished in operation, and no further adjustment is required after the guide roller 23 has once been longitudinally adjusted. As mentioned above, the drum 11 is tapered with its larger diameter at the flange 12 so that the film will ride adjacent the flange at all times, thus providing accurate edge guiding of the film immediately at the translation point. This simplified form of film drive in which film is tensioned over the recording drum and to a single sprocket which serves as both the feed and drive sprocket, provides very steady film advancement over the drum and prevents external film tension variations from being transmitted to the film while passing over the drum.

Referring now to Fig. 6, a modification of the drive shown in the preceding figures, is illustrated, this modification having a similar drive sprocket 72 and recording drum 73, the film 74, however, passing over an idler sprocket 75 between the drive sprocket 72 and the roller 73 in a manner similar to its passage over sprocket 72. The idler sprocket 75 has its shaft under the tension of a spring 76, so that all the film intermediate it and the drum 73 is under tension, the sprung sprocket 75 serving as a filter. The sprocket 75 is film pulled.

A third modification is shown in Fig. 7, in which a separate feed sprocket 80 and a separate drive sprocket 81 are employed. The recording drum is shown at 82. In this modification, separate idler sprockets 84 and 85 are interposed between the drive and feed sprockets and the roller 82, these sprockets being geared together by a pair of gears 87 and 88. The sprocket 84 is mounted on an arm 90 pivoted on the shaft of the sprocket 85 and is under tension of a spring 91, thus placing tension on the film loops intermediate the sprockets 84 and 85 and the roller 82. Thus, the two modifications shown in Figs. 6 and 7 utilize the same principle which places the film around the recording roller under filter tension provided by a spring and the mass of an idler sprocket or sprockets. Although the drums 73 and 82 may be driven by the above mentioned magnetic drive to provide damping, the drums may be used with solid flywheels, damping being provided by viscous couplings or dash-pots attached to the sprockets 75 and 84, well-known in the art.

I claim:

A sound film apparatus comprising a mounting plate, a sprocket mounted on said plate and adapted to advance film thereover, a recording drum mounted on said plate around which said film is adapted to advance, a first idler roller resiliently held against the outer face of said film between said drum and said sprocket, a second idler roller resiliently held against the inner face of said film between said drum and said sprocket independently of said first roller, said idler rollers maintaining tension on the film between said drum and said sprocket, whereby high frequency variations in film speed are substantially eliminated, and a magnetic drive connected to said drum to provide damped rotation thereof, whereby low frequency variations in film speed are substantially eliminated.

MILFORD E. COLLINS.

REFERENCES CITED

The following references are of record in the file of this patent:

UNITED STATES PATENTS

| Number | Name | Date |
|---|---|---|
| 1,831,562 | Heisler | Nov. 10, 1931 |
| 1,899,571 | Kellogg | Feb. 28, 1933 |
| 2,108,337 | Hoffman | Feb. 15, 1938 |
| 2,120,476 | Victor | June 14, 1938 |
| 2,157,393 | Black | May 9, 1939 |
| 2,259,715 | Woolf | Oct. 21, 1941 |
| 2,273,024 | DeVry et al. | Feb. 15, 1942 |
| 2,338,414 | DeSart, Sr., et al. | Jan. 4, 1944 |